Patented Mar. 14, 1950

2,500,902

UNITED STATES PATENT OFFICE 2,500,902

2-ALLYLPHENYL ESTER OF BENZOIC ACID

Ezra Monroe, Midland, and Clare Hand, Sanford, Mich., assignors to The Dow Chemical Company, Midland, Mich., a corporation of Delaware No Drawing. Application April 13, 1949
Serial No. 87,374

1 Claim. (Cl. 260—476)

This invention is concerned with the 2-allylphenyl ester of benzoic acid having the formula:

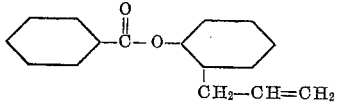

The new ester compound is an oily liquid somewhat soluble in many organic solvents and substantially insoluble in water. It is of value as a toxic constituent of parasiticidal compositions.

The new compound may be prepared by reacting benzoylchloride with an alkali metal salt of 2-allylphenol. Substantially equimolecular proportions of the reactants have been found to give the ester product in good yield. In practice, the phenolate employed is preferably the sodium salt and may be prepared by reacting substantially equimolecular proportions of sodium hydroxide and the 2-allylphenol in water. The reaction between the phenolate and benzoylchloride is then conveniently accomplished by adding the latter portionwise to the above mixture with stirring and at a temperature of from 0° to 35° C. Following the reaction, the ester compound may be separated by conventional methods such as decantation and fractional distillation.

In a representative preparation, 42 grams (1.05 moles) of sodium hydroxide and 134 grams (1.0 mole) of 2-allylphenol were dissolved in 400 milliliters of water to form a solution of the corresponding phenolate. 140.5 grams (1.0 mole) of benzoylchloride was added portionwise to the above mixture over a period of 1⅚ hours with stirring. The addition was carried out at a temperature of from 2° to 11.5° C. Following the reaction, the crude mixture was diluted with chlorobenzene, washed with water, and fractionally distilled under reduced pressure to obtain the 2-allylphenyl ester of benzoic acid as an oily liquid. The latter had a boiling point of 184° C. at 3.8 millimeters pressure, a specific gravity of 1.0915 at 25° C. and a refractive index $n/D$ of 1.5674 at 25° C.

To demonstrate the utility of this compound, a portion of the above product was dispersed in water to prepare a parasiticidal composition. The proportions of the constituents were 0.5 pound of toxicant, 0.083 pound of the dioctyl ester of sodium sulfosuccinic acid (Aerosol OT), and 0.25 pound of refined kerosene per 100 gallons of solution. When employed for the control of two-spotted spider mite, such composition gave a control of 94 per cent.

We claim:
2-allylphenyl ester of benzoic acid.

EZRA MONROE.
CLARE HAND.

No references cited.